US010528372B2

(12) United States Patent
He et al.

(10) Patent No.: US 10,528,372 B2
(45) Date of Patent: *Jan. 7, 2020

(54) PROVIDING USER INTERFACE LANGUAGE OPTIONS

(71) Applicant: INTERNATIONAL BUSINESS MACHINES CORPORATION, Armonk, NY (US)

(72) Inventors: Jenny J. He, Eastleigh (GB); Adrian P. Kyte, Dorset (GB); Tobias Leicher, Stuttgart (DE); Guan Jun Liu, Beijing (CN); Joseph R. Winchester, Hursley (GB); Bei Chun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/803,278

(22) Filed: Nov. 3, 2017

(65) Prior Publication Data

US 2018/0164968 A1 Jun. 14, 2018

Related U.S. Application Data

(63) Continuation of application No. 15/378,631, filed on Dec. 14, 2016.

(51) Int. Cl.
*G06F 9/451* (2018.01)
(52) U.S. Cl.
CPC ................... *G06F 9/454* (2018.02)
(58) Field of Classification Search
CPC .................................................. G06F 16/958

USPC .................................................. 715/761–765
See application file for complete search history.

(56) References Cited

U.S. PATENT DOCUMENTS

| 7,912,878 | B2 | 3/2011 | Hazlewood et al. |
| 8,031,943 | B2 | 10/2011 | Chen et al. |
| 2012/0290940 | A1 | 11/2012 | Quine |
| 2012/0291005 | A1* | 11/2012 | Quine ...................... G06F 8/00 717/105 |
| 2012/0291011 | A1 | 11/2012 | Quine |
| 2013/0246039 | A1 | 9/2013 | Duneau |
| 2015/0019944 | A1* | 1/2015 | Kalgi .................... G06F 16/958 715/205 |

OTHER PUBLICATIONS

He et al., "Providing User Interface Language Options," U.S. Appl. No. 15/378,631, filed Dec. 14, 2016 pp. 1-43.
List of IBM Patents and/or Patent Applications Treated as Related, dated Jan. 12, 2018 pp. 1-2.

* cited by examiner

*Primary Examiner* — Cao H Nguyen
(74) *Attorney, Agent, or Firm* — Tracey Robertson; Blanche E. Schiller, Esq.; Heslin Rothenberg Farley & Mesiti P.C.

(57) ABSTRACT

User interface (UI) language options are provided. A request event of a visible text string for a UI element is identified. A user value area of a control of the UI element is inspected to obtain a resource bundle name and key for one or more language equivalents of the text string of the UI element. A menu option is added to the request event by retrieving the language equivalent of the text string in one or more languages from a resource bundle of the application using the resource bundle name and key.

9 Claims, 6 Drawing Sheets

PROVIDING USER INTERFACE LANGUAGE OPTIONS

CROSS-REFERENCE TO RELATED APPLICATIONS

This application is a continuation of co-pending U.S. application Ser. No. 15/378,631, entitled "PROVIDING USER INTERFACE LANGUAGE OPTIONS," filed Dec. 14, 2016, which is hereby incorporated herein by reference in its entirety.

BACKGROUND

Aspects of the present invention relate to providing user interface language options, and more specifically, to providing language options for text of user interface elements.

Localization uses methods of transforming computer applications to different languages, regional differences and technical requirements of a target audience known as the locale. An application may be localized by adding locale-specific components and translating user visible text that is externalized into resource bundles that are separate to the computer application code module. The text in the resource bundle is translated into different languages for different regions or locales where the application is operated. Resource bundles of applications exist for each language. The application may load a locale-specific resource from the resource bundle that is appropriate for the locale. Application code may be written which is independent of the locale by isolating the locale-specific information in resource bundles. This allows the application code to be created and distributed independently of the resource bundles.

The text displayed by a user interface is the most obvious example of locale-specific data. For example, an application with a "Cancel" button in English speaking countries will have an "Abbrechen" button in German speaking countries. In other countries, this button will have other labels. This button label should not be hard-coded if the application is intended to be used in different countries. Isolating the locale-specific objects in a resource bundle enables different language options to be provided. In general, the objects stored in a resource bundle are predefined and ship with the product.

A user of software with a graphical user interface (GUI) may wish to use words contained within the GUI of an application, for example, to search the web for additional information. An example of this is when a message appears indicating a possible error and they want to see if others have encountered the same message and what their resolution was.

A problem occurs when a user wishes to use text from the software, such as an error message, to search the web but the user is running the software in a language different to the language that the web content is written in. The advantage of using the web, rather than the built-in documentation for the product, is that this will search forums, blogs, and other content that includes results and answers from the range of Internet users.

For example, the user may be running the software in German and may have an error message: "Verbindungsaufbau fehlgeschlagen mit Fehler 'Moglicher SSL'". The English version of the software has the corresponding error message: "Connect failed with error 'Possible SSL connection failure'".

When a user who uses the software in German wants to search the web for help with the error they might copy the error message into their clipboard, paste it into a search engine, and look for results. If the web content is in English, then the search for the German phrase finds no results.

The search for the English error message finds links to blogs and forums for how to solve the problem, posted by other users who have encountered the same problem and written how to resolve it.

One solution for the German user is to use an on-line translation. If this solution is used, then errors in translation may occur. For example the phrase: "Verbindungsaufbau fehlgeschlagen mit Fehler Moglicher ssl" may result in "Connectionless failed with error of possible ssl". Searching on this inaccurate English translation does not yield the search results that the actual English error message does and the German user cannot find the right forum entries.

A solution that occurs is that users in countries where English is not the primary language run the software in English because this gives them the widest scope to reference on-line material, such as blogs, forums, wikis to guide them through the software usage. A typical scenario is that German users run their software in English, rather than German. This creates a need for the end user to be literate in English to be able to operate the software, restricting the skill and cost of the end user.

Another solution is to prefix all messages with a unique ID that is not translated, for example, an error message might have a prefix IZE0106E that a user can select and use as the search string for documentation and help. The disadvantage of this is that the string keys clutter the screen. They are also only shown in error messages and not descriptive strings so they are limited in where they are and where results can be found. In forum posts where end users are describing how to resolve a problem, the unique ID may not be included as the English discussion will be about the words of the message rather than the ID.

SUMMARY

Shortcomings of the prior art are overcome and additional advantages are provided through the provision of a computer-implemented method of providing user interface (UI) options carried out by a user interface adapter. The method includes, for instance, identifying a request event relating to a text string for a UI element of an application. A user value area of a control of the UI element is inspected to obtain a resource bundle name and key for one or more language equivalents of the text string of the UI element. A menu option is added to the request event by retrieving a language equivalent of the text string in one or more languages from a resource bundle of the application using the resource bundle name and key.

Computer program products and systems relating to one or more aspects are also described may be claimed herein.

Additional features and advantages are realized through the techniques described herein. Other embodiments and aspects are described in detail herein and are considered a part of the claimed aspects.

One or more aspects of the invention provide an advantage of language selection of user interface text strings providing the original translations from the language bundle of the application. This removes a need for obtaining a translation of a text string, which may be inaccurate.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the FIGS. have not necessarily been drawn to scale. For example, the dimensions of some of the elements may be exaggerated relative to other elements for clarity. Further, where considered appropriate, reference numbers may be repeated among the FIGS. to indicate corresponding or analogous features.

DETAILED DESCRIPTION

The described methods and systems provide user interface (UI) language options to an end user of an application. A user may select a text string from a UI element and may obtain the translation of the text string as provided in a language bundle of the application.

Graphical control elements or widgets provide elements of interaction in a UI of an application referred to as UI elements. There may be text strings associated with the UI elements. For example, there may be text strings for a label, in a dialog box, in an information bar, in an error message, etc. The text string is displayed to the user in the UI in the language in which the application is operating. However, due to localization of applications, resource bundles are associated with the application that provide original developer-provided translations of the text strings in the other languages that the application may be operated in.

The described methods and systems enable a user of the application using the application in a first language to obtain an original translation of a text string in a second language and, optionally, additional languages, from the resource bundles. The user may wish to only view the translation of the text string or may copy it to a clipboard.

In one example embodiment, a user may select a text string in the form of an error message displayed in the UI and may wish to obtain the error message in a different language in order to research the error. An option may be provided in the UI to select and copy the text string in one or more alternative languages. The text string may then be provided in the one or more alternative languages as provided in a language bundle of the application for localization purposes.

The described methods and systems enable the utilization of a menu action for a UI to reach into an application's original language bundles using a key for the UI element and retrieve the value for the selected language. The method may be implemented without any changes to the application and may utilize a pre-compiler component to inject lines into the application's object code to transmit a resource bundle name and key to each UI element.

Figure 1:
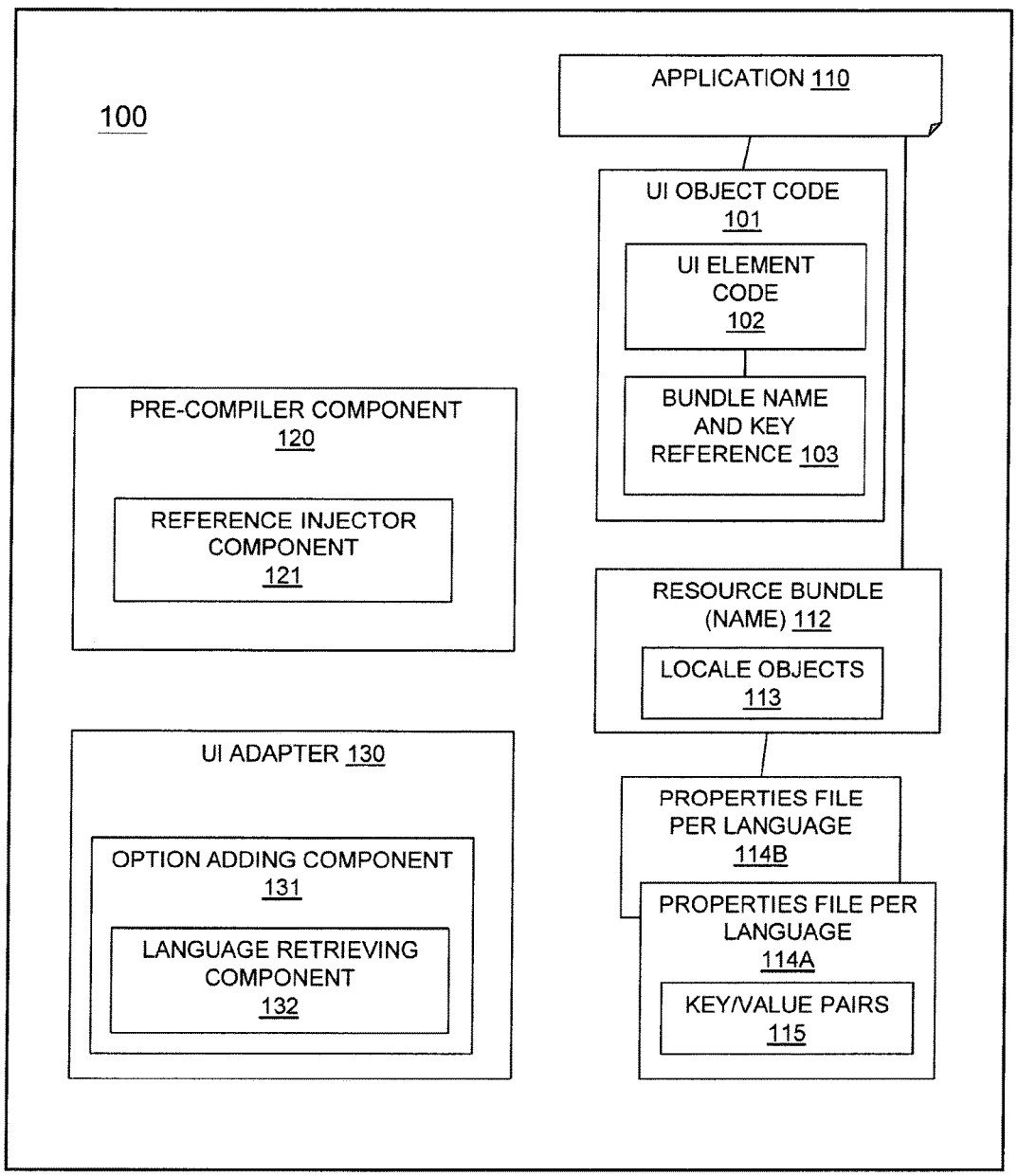
FIG. 1 is a block diagram of an example embodiment of a system in accordance with one of more aspects of the present invention.

Referring to FIG. 1, a block diagram shows an example embodiment of the described system 100.

The system 100 includes an application 110 which may have UI object code 101, which is used for programing the function of UI elements such as widgets and controls used in the application 110. The UI object code 101 includes UI element code 102 relating to UI elements that include references to user visible text strings. "User visible" text strings means that the string contains language text that narrates the applications in respect of being an instruction or information in the language the user has defined as the operating language when interacting with the application.

UI object code 101 is responsible for creating the UI that the user sees and reacts with their keyboard and mouse, and the application 110 reacts to by updating UI elements such as lists, trees, tables, etc. with application data. The UI object code 101 when creating the UI elements builds some that do not change between different language translations (such as text input fields, size and position of lists), as well as some UI elements whose content does change between different language translations (such as labels, menu items, titles, error messages, etc.).

The application 110 may have one or more associated resource bundles 112 which are identified by a bundle name. A resource bundle 112 may have locale objects 113 for each locale accommodated by the resource bundle 112 with corresponding properties files 114A, 114B for each language. The properties files 114A, 114B include key/value pairs 115 wherein a key relates to a visible text element and the value is the translated form of the visible text element. One of the properties files 114A, 114B may be a default primary language file. The keys are referenced when retrieving text in different languages.

A pre-compiler component 120 may be provided including a reference injector component 121 which may inject code into the UI object code 101 to add a resource bundle name and key reference 103 for UI element code 102 relating to UI elements having a visible text string relating to the key reference. Each UI element code 102 for different UI elements having associated visible text strings may have injected code to reference a resource bundle name and key reference 103.

A UI adapter 130 may be provided which may be independent of the application 110 and which listens to UI events such as window events. The UI adapter 130 includes an option adding component 131 for adding a language option to a UI element by reference to the bundle name and key reference in the UI element code 102. The option adding component 131 may include a language retrieving component 132 for retrieving an alternative language original translation for the UI element from a referenced properties file 114A, 114B of a resource bundle 112 when requested by a user.

In one embodiment of the described system, each UI element knows, not only the current visible text string it displays, but also the resource bundle and key used to create its current visible text string.

Figure 2:
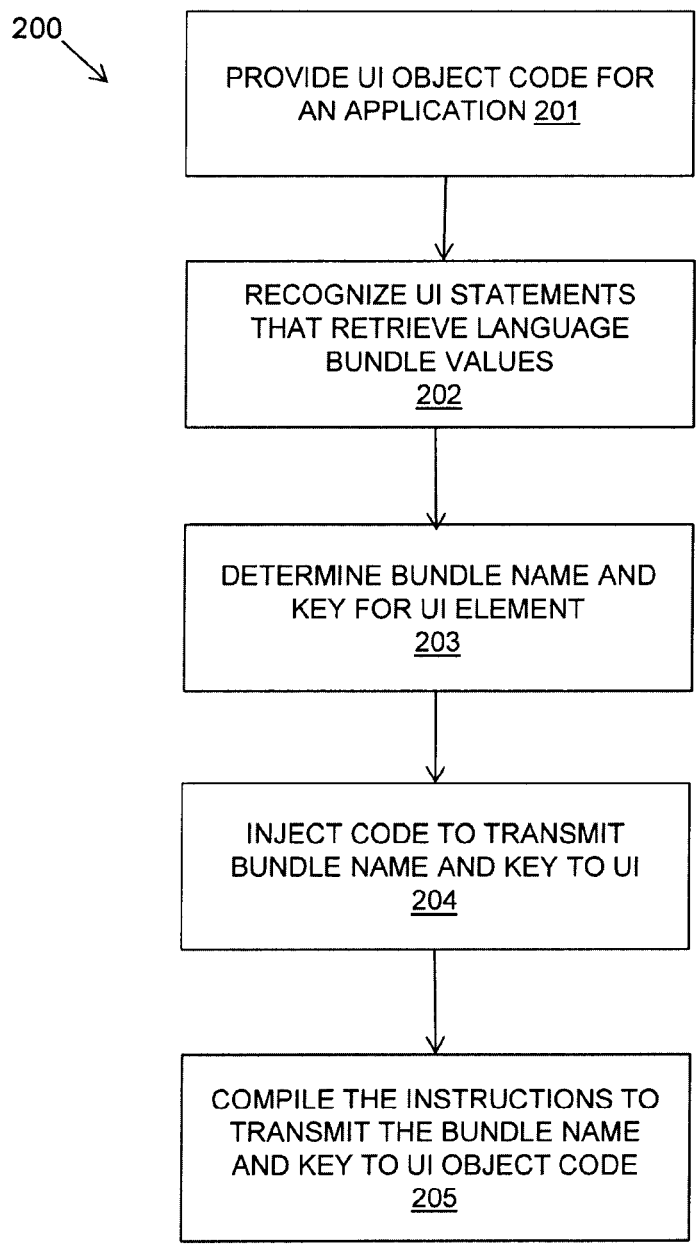
FIG. 2 is a flow diagram of an example embodiment of a first aspect of a method in accordance with one or more aspects of the present invention.

Referring to FIG. 2, a flow diagram 200 shows an example embodiment of an aspect of the described method as carried out by the pre-compiler component 120 for modifying UI object code 101 of an application 110.

UI object code 101 may be provided 201 for an application 110 and the pre-compiler component 120 may recognize 202 the code statements in the UI object code 101 that retrieve language bundle values for use in UI elements having visible text strings.

The code statements that retrieve language bundle values are written by the string externalizer and are recognizable by their syntax.

The method may determine 203 the bundle name and key from the code statements in the UI object code that retrieve the language bundle values for externalization.

The pre-compiler component 120 may inject object code 204 in the UI object code 101 to transmit the bundle name and key to the UI element.

The instructions to record the bundle name and key are then compiled 205 into UI object code. The pre-compiler injects the code that then gets compiled into the actual object code instructions. At runtime, the actual object code instructions then execute to move the bundle name and key into the UI element and the actual values are inserted into the UI element when the UI element is created.

The bundle name and key may be stored in the user data of the UI element. Every window UI element has, e.g., values such as its color, text, size, location, etc. There are arbitrary value slots in what is known as the user data and the pre-compiler's statements' byte codes store the bundle name and key into the user data of the UI element.

An example is provided with the following UI object code 101 in which the injected object code is underlined. The statements preceding the underlined code, are recognized by the pre-compiler component 120 as having syntax of the string externalizer. These statements are provided by default in Java (Java is a trademark of Oracle Corporation) using a standard Eclipse (Eclipse is a trademark of Eclipse Foundation) externalization wizard. The underlined injected code exists in the object code and not the original source code that remains unchanged. The underlined code enables the resource bundle name and key to be injected into the UI element enabling the UI adapter 130 to retrieve these.

Bundle bundle=
Bundle.getBundle(Class.getName( ).getBundle("Messages"));
Button b=new Button( );
b_bundle_name="Messages";
b.setUserValue("text_bundle_name",b_bundle_name);
b.setText(bundle.getString("Button_push"));
b_bundle_key="Button_push";
b.setUserValue("text_bundle_key",b_bundle_key);

The build step of the pre-compiler component 120 recognizes the statements that retrieve language bundle values for use in user interface elements and inserts object code that records the language bundle source name and key used in the UI element. This does not modify the source code of the application; it injects byte codes similar to other pre-compiler technologies used by frameworks, such as aspect-oriented programming extensions.

The pre-compiler component 120 detects the patterns of where a string has been externalized and inserts new lines that set the resource bundle name and key so that at runtime the user interface has these present. The reference to the resource bundle name and key for the text string of the UI element is used so that the UI adapter 130 can retrieve these and look up the original language strings.

An example illustrating the described method is provided below. Source codes that use language resource bundles for user visible strings follow a pattern that is generated by externalization programs. For example,
Button b=new Button( );
button.setText("Push me");
is converted by externalization wizards to:
Bundle bundle=
Bundle.getBundle(Class.getName( )getBundle("Messages"));
Button b=new Button( );
b.setText(bundle.getString("Button_push"));

The problem that this causes and is addressed by one or more aspects of the described method is that only the words "Push me" are known at runtime and given to the button. The pop-up menu is to know the original bundle name and the key used, in this case, the bundle name of "Messages" and the key of "Button_push". This allows the method to reach into the raw bundle files and look for the particular language values, for example, "_de" ones to get the German string.

Aspects of the method use the user value area of UI element controls as data stores to put the bundle name and bundle value, with a pre-compiler step that reads the machine generated syntax of the externalization string and adds byte codes that effectively inject the source lines underlined below.

Bundle bundle=
Bundle.getBundle(Class.getName( ).getBundle("Messages"));
Button b=new Button( );
b_bundle_name="Messages";
b.setUserValue("text_bundle_name",b_bundle_name);
b.setText(bundle.getString("Button_push"));
b_bundle_key="Button_push";
b.setUserValue("text_bundle_key",b_bundle_key);

With the UI element controls now having the bundle key and name, the method may use this to locate bundles in the alternative language locations, such as "en_US" when the program is running in German, or "de" when the program is running in English.

In an alternative embodiment, the source code may be modified to include the references to the resource bundle name and key for each UI element having a text string. However, this is expensive and intrusive in the code and possibly error prone as the bundle name and key may be defined in multiple places in the source code.

In a further alternative embodiment, the source code may be scanned and replaced to insert the relevant additional lines in the source code but these would then clutter the code and make it more complex. The pre-compiler component 120 effectively does this but it just injects the runtime byte codes so only the object code has the extra logic keeping the source code original.

Aspects of the described method use a single source of the bundle name and key in the source code and then use this in the pre-compiler step to inject the lines without any source code duplication or cluttering.

Figure 3:
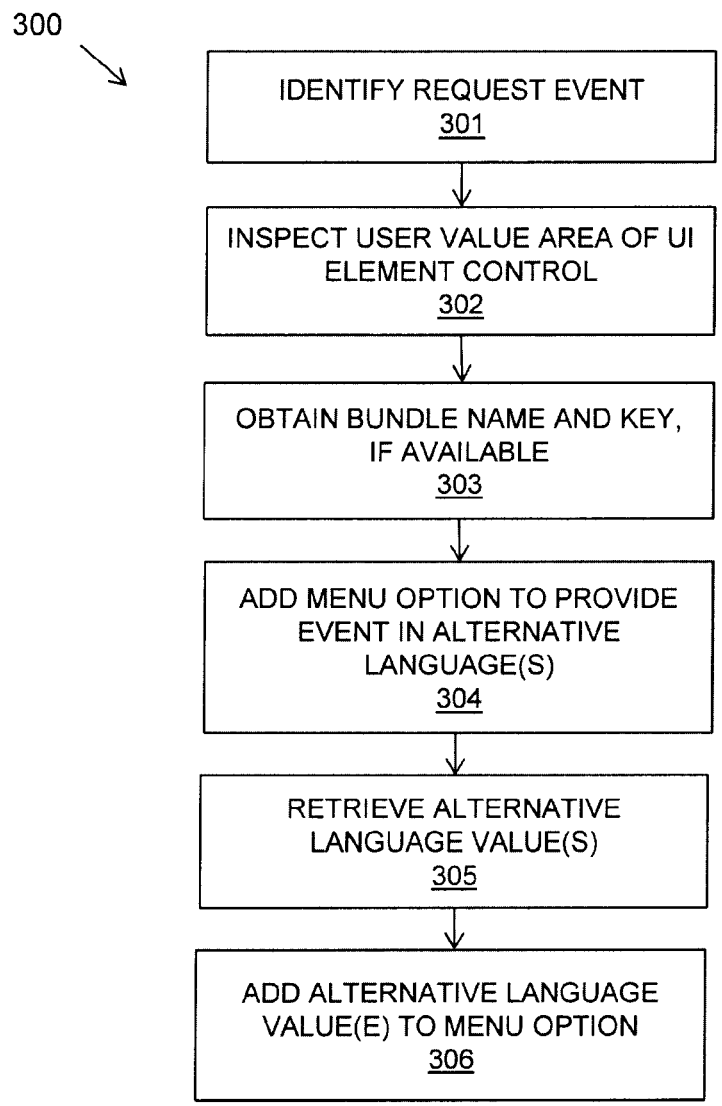
FIG. 3 is a flow diagram of an example embodiment of a further aspect of a method in accordance with one or more aspects of the present invention.

Referring to FIG. 3, a flow diagram 300 shows an example embodiment of an aspect of the described method as carried out by a UI adapter 130.

The flow diagram 300 shows an example embodiment of a method of adding a language option to a UI element as carried out, for example, by an option adding component 131 of the UI adapter 130, and for retrieving the language text, for example, by a language retrieving component 132.

The UI adapter 130 may listen to window events in the UI. The method may identify 301 a request event, such as a selection of a visible text string for a UI element, for example, a text string copy request. When an event for a pop-up menu is raised and the window is created, the UI adapter 130 will be aware of these events. In the example of a copy request, if the UI adapter 130 sees the "Copy" option, it knows that the UI element that the menu is being created for has some possible text (it could be an image).

The method may inspect 302 the user value area of the UI element control and may obtain 303 a bundle name and key, if available. Being available is determined by the bundle_resource_name and bundle_key being in the user data with values that are inserted by the pre-compiler injecting the byte codes into the application program when it sees the pattern for the externalized strings.

A menu option may be added 304 to the request event for a language option in one or more alternative languages to the language in which the application is operating. The UI adapter 130 may look up the resource bundle and key to determine the available languages in the resource bundle. One language may be designated as a primary language. Appropriate menu options may then be added 304 indicating options of using the languages available.

The UI adapter 130 may use the available resource language bundle name and key to retrieve 305 the alternative language value(s) from the resource bundle. The alternative language value(s) may be added 306 to the menu option(s).

The method may retrieve 305 the alternative language value(s) by looking up the named resource bundle and identifying a properties file for a language and retrieving the value for the specified key.

A menu option of a UI element is built on request when a user asks for it and disposed of when the menu is dismissed. This enables a menu to be dynamic based on, for example, what is in the clipboard (when paste is enabled) or what is selected (when copy or cut is enabled). The adapter retrieves the alternative language values at runtime when the menu is being built during the use of the UI.

In one embodiment, a primary language is defined as one of the properties files and the method may retrieve only the primary language. A primary language may be English or another language. For example, applications may be written in Chinese with Chinese being the main source of Internet support for a particular field of applications, and therefore, Chinese may be the primary language. In other embodiments, a choice of languages may be provided as a selected language for retrieval.

The option provided may display, beneath the "Copy" option, an additional option of "Copy in English" or it may display "Copy nnn" where "nnn" is the retrieved text value. In both cases, the retrieved language is made available to the user.

For example, an original en_US english string may be retrieved and added as a new menu item and "Copy nnn" is where nnn is the original en_US_english text. An example might be "Copy 'An FTP File Buffer Error has occurred'", where 'An FTP File Buffer Error has occurred' is the retrieved English text. The retrieved English message in its English original is made available to the user in this way.

In one embodiment, the UI adapter may be a general window display adapter listener registered with the operating system windowing toolkit. All messages are posted onto a windows event queue. For example, there is a pop-up menu requested event and a pop-up menu created event. When the pop-up menu created event is received, the adapter receives the menu and can inspect its contents to see if, for example, "Copy" is an option provided. The adapter may also see the window handle for the UI element that raised the request.

When a pop-up request event is seen, the adapter may inspect the control's user data to see if it contains details of the original bundle name and key. If so, then a menu action including retrieving the value in an alternative language, or languages, may be added.

The adapter may go back to the UI element to see if it's user data contains the keys for bundle_resource_name and bundle_key and, if so, it may go to the file directly for the original language to lookup for the key, and from this, the adapter may create the word "Copy xxx" where xxx is the original language value for the bundle key, and add this as a menu button below the "Copy".

When a menu action is taken by the user, this generates a GET_MENU on the windows event message queue. When this message is replied to and the menu is created with the CREATE_MENU, the method has knowledge of the UI element the request was for, and uses the language bundle name and key to retrieve an original English value and add the "Copy in English" menu item beneath "Copy". The method may intercept the CREATE_MENU message, see that a "Copy" item exists (or equivalent in the user's language), and then from the control find the original value.

In an example, an application is able to be run in multiple languages and the user is running the software in a language different to the one that the web content is written in. For example, the user may be running the application in German and may have an error message: "Verbindungsaufbau fehlgeschlagen mit Fehler 'Moglicher SSL'". The English version of the software has the corresponding error message: "Connect failed with error 'Possible SSL connection failure'".

The described method enables a user to select a string in a screen control, such as a label or text area, and allows the user to copy and paste the value of the contents of the string in a selection of languages and not just in the current language being displayed. In the given example, an option may be provided to copy the error message "Verbindungsaufbau fehlgeschlagen mit Fehler 'Moglicher SSL'" in English as "Connect failed with error "Possible SSL connection failure'" which is the corresponding text if the application were run in English.

Figure 4:
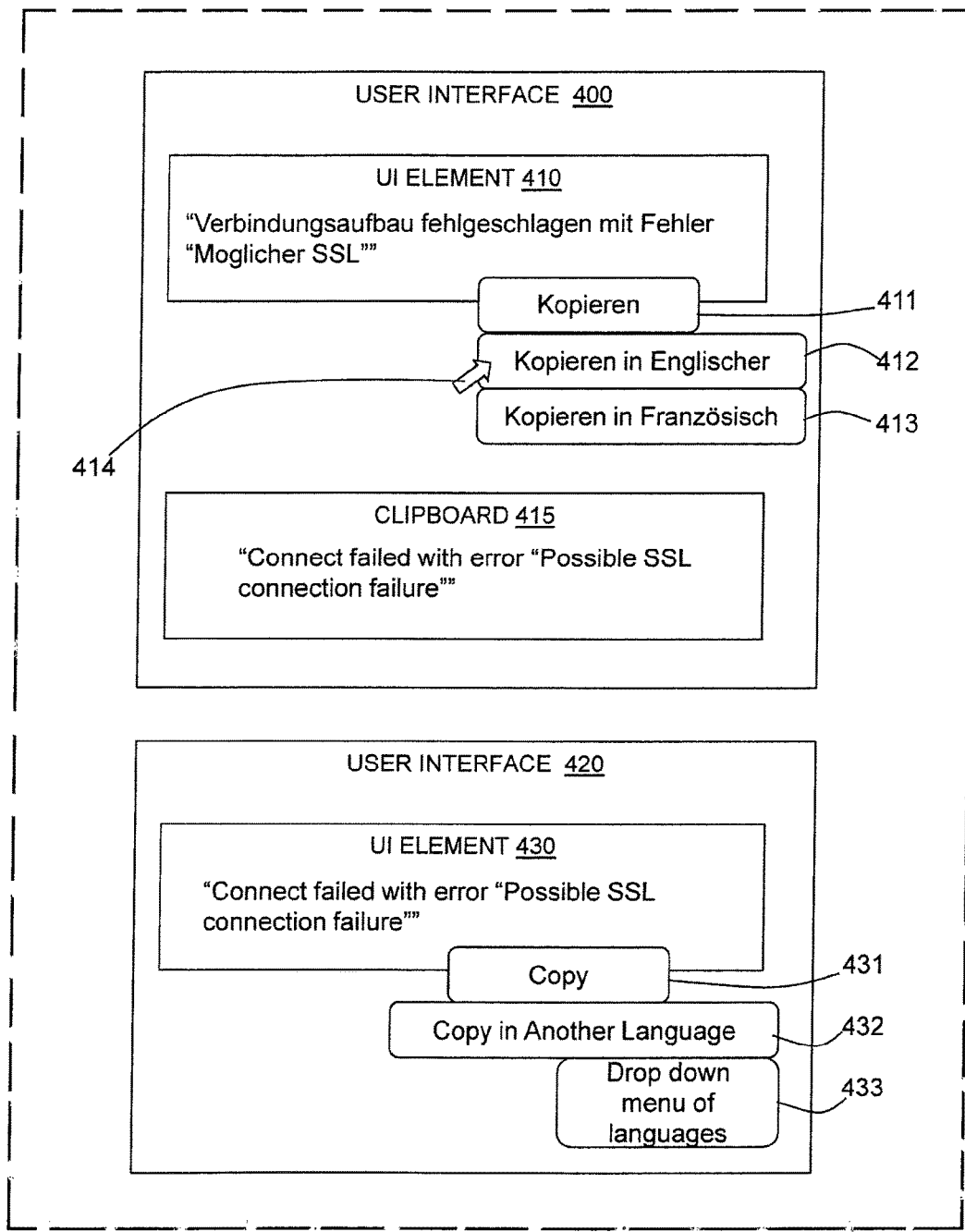
FIG. 4 is a schematic diagram illustrating a user interface element option in accordance with one or more aspects of the present invention.

Referring to FIG. 4, a schematic diagram illustrates a user interface 400 of an application operating in German and an equivalent user interface 420 of the same application operating in English.

The user interface 400 shows a UI element 410 in the form of an error message displayed on the user interface 400. The error message is in German and has the text string: "Verbindungsaufbau fehlgeschlagen mit Fehler 'Moglicher SSL'".

The user interface 420 shows the same UI element 430 in the English equivalent application as: "Connect failed with error 'Possible SSL connection failure'".

Using the described method and system, the UI element 410 in the German application may provide options to copy the text "Kopieren" 411, copy the text in English "Kopieren in Englischer" 412, and optionally other languages, for example, "Kopieren in Französisch" 413. A language may be selected as a primary language of the application in which case the copy option may be to the primary language of the application.

In this example, a user of the user interface 400 selects the option 412 to copy in English using the user interface's cursor 414. The text string of the UI element 410 is retrieved from the application's resource bundle and may be pasted to a clipboard 415 of the user interface 400 as the original English language equivalent of the error message: "Connect failed with error 'Possible SSL connection failure'".

Similarly, the user interface 420 of the English equivalent application may provide options to copy 431 or copy in another available language 432. The different available language options may be provided in an additional drop down menu 433 for all languages included in the language resource bundle of the application. In another embodiment, the available languages may be specified in configurable preferences for an application, for example, if users are generally fluent in a second given language.

This enables copying and pasting a visible text string content of a UI element to a clipboard in both a primary language as well as a language in which the application is operating and is usually displayed. This is useful for searching and retrieving additional information of the visible text string, as well as providing clearer understanding for a user fluent in the alternative language.

The selection of languages may be any other configured language that the application has the ability to operate in. The contents of the string in other languages are obtained from the software product's translated language resource bundle; therefore a high fidelity of translation between different languages is achieved.

A further example would be a French application that in Germany says: "Verbindungsaufbau fehlgeschlagen mit Fehler 'Möglicher SSL-Verbindungsfehler Angegebene Konfiguration SSL=true. Ursprüngliche Ausnahmebedingung war (winmvs2c:21)'".

The original French phrase for this is: "Echec de connexion ayant généré l'erreur "Echec de connexion SSL possible. La configuration indiquait SSL=true. L'exception d'origine était (winmvs2c:21)'."

The context menu in German, if the application was configured to have French as its primary language may provide the option of:

"Kopie auf Franzosich".

Similarly, if the application was written in Chinese the original text may be:

连接失败，错误为 "SSL 连接可能失败。配置指定的 SSL=true。

The ability to reach into the program's original language bundles using aspects of the described method provides an exact translation, which is extremely valuable particularly for users of non-English software. One or more aspects of the method pull the translation from the original application resource bundles, and therefore, this provides complete fidelity with the other language. Without this link to the program translatable resources, a search on text can be rendered near useless.

The described method and system allow a user to run the software in the language that they are most fluent in, but when they copy to the clipboard they are given the choice of copying in either the screen language or else a different language. The different language may be set to be a primary language, such as US English, and in this case the string in the clipboard will be the original string that would have been displayed to the user had they been running the software in the primary language. In other embodiments, a choice of languages may be provided.

A web search carried out using copied text will be using the precise words with no emulated translation required and will therefore be more informative of relevant results. If the end user cannot read the primary language for the search results to understand the forum answers, they may use their browser to translate the results and get relevant information. However, the fidelity of finding the results is no less than for the application being run by a user in the primary language.

Aspects of the method result in the highest fidelity result as it accesses the actual program translatable resource, instead of a translator program that can often arrive at a very different translation. When the high fidelity text strings are used for searching forums, blogs, and other content, results and answers from the range of Internet users can be found easily.

Figure 5:
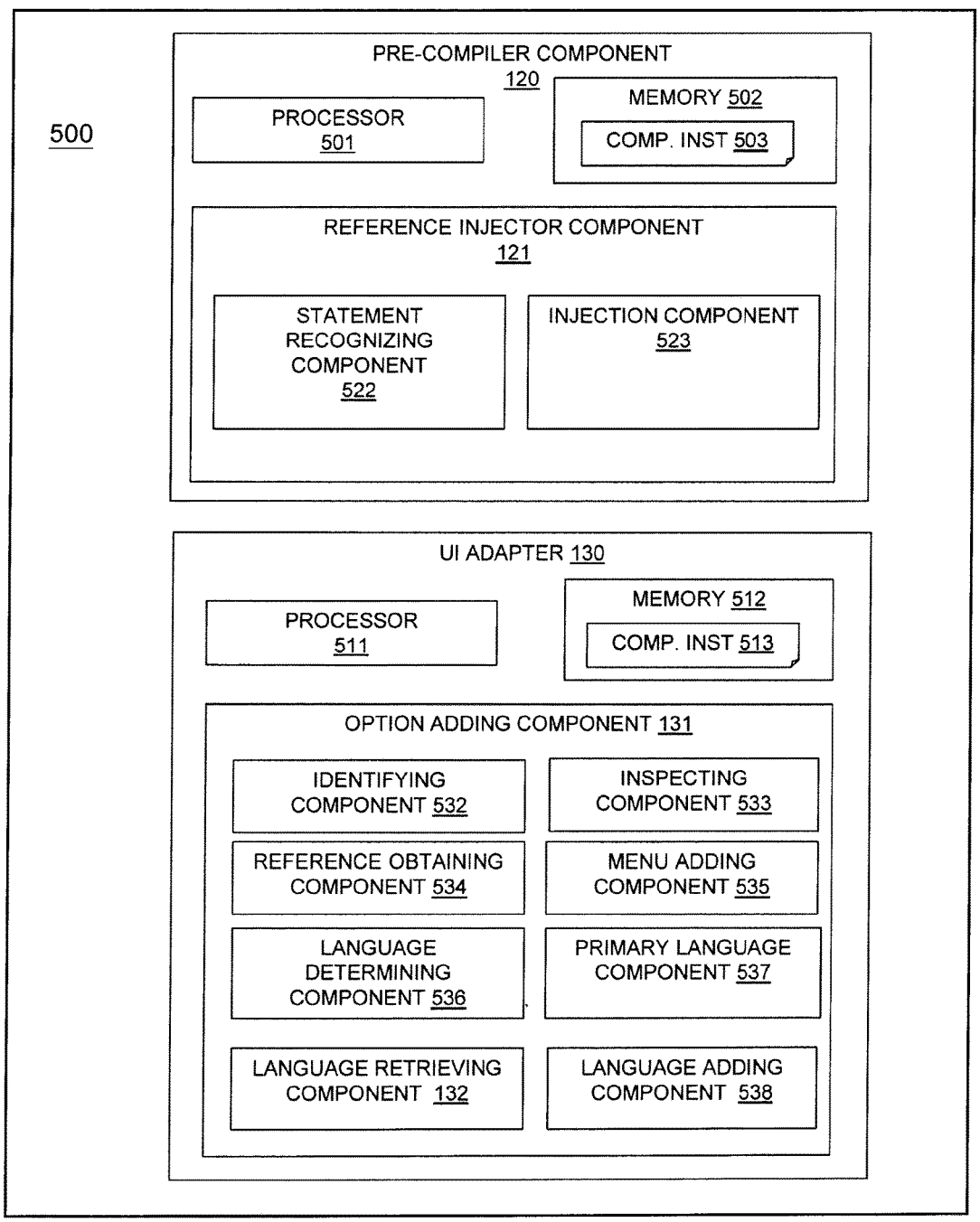
FIG. 5 is a block diagram of an example embodiment of a system in accordance with one or more aspects of the present invention.

Referring to FIG. 5, a block diagram shows an example embodiment of the described system 500.

As described in relation to FIG. 1, the system may include a pre-compiler component 120 which may include at least one processor 501, a hardware module, or a circuit for executing the functions of the described components which may be software units executing on the at least one processor. Memory 502 may be configured to provide computer instructions 503 to the processor 501 to carry out the functionality of the described components.

The pre-compiler component 120 may include a reference injector component 121 which may include a statement recognizing component 522 for recognizing a code statement in an application that retrieves language bundle values for use in UI elements and an injection component 523 for injecting lines into the application to transmit a bundle name and key to the user interface elements.

As described in relation to FIG. 1, the system may also include a UI adapter 130 which may include at least one processor 511, a hardware module, or a circuit for executing the functions of the described components which may be software units executing on the at least one processor. Memory 512 may be configured to provide computer instructions 513 to the processor 511 to carry out the functionality of the described components.

The UI adapter 130 may include an option adding component 131 which may include an identifying component 532 for identifying a request event of a visible text string for a UI element. The option adding component 131 may also include an inspecting component 533 for inspecting a user value area of a control of the UI element and a reference obtaining component 534 for obtaining a resource bundle name and key for one or more language equivalents of the text string of the UI element. The option adding component 131 may also include a menu adding component 535 for adding a menu option to the request event for a retrieving action for retrieving the language equivalent of the text string in one or more languages.

The option adding component 131 may also include a language determining component 536 for determining the one or more language equivalents that are available in the resource bundle by referencing the resource bundle name and key. The option adding component 131 may also include a primary language component 537 for determining if a primary language equivalent is available in the resource bundle by referencing the resource bundle name and key.

The option adding component 131 may include a language retrieving component 132 for locating the bundle name and key for a language equivalent and retrieving a language equivalent value by looking up the named resource bundle and identifying a properties file for the language and retrieving the value for the specified key. The option adding component 131 may include a language adding component 538 for adding the retrieved language value to the menu option.

Figure 6:
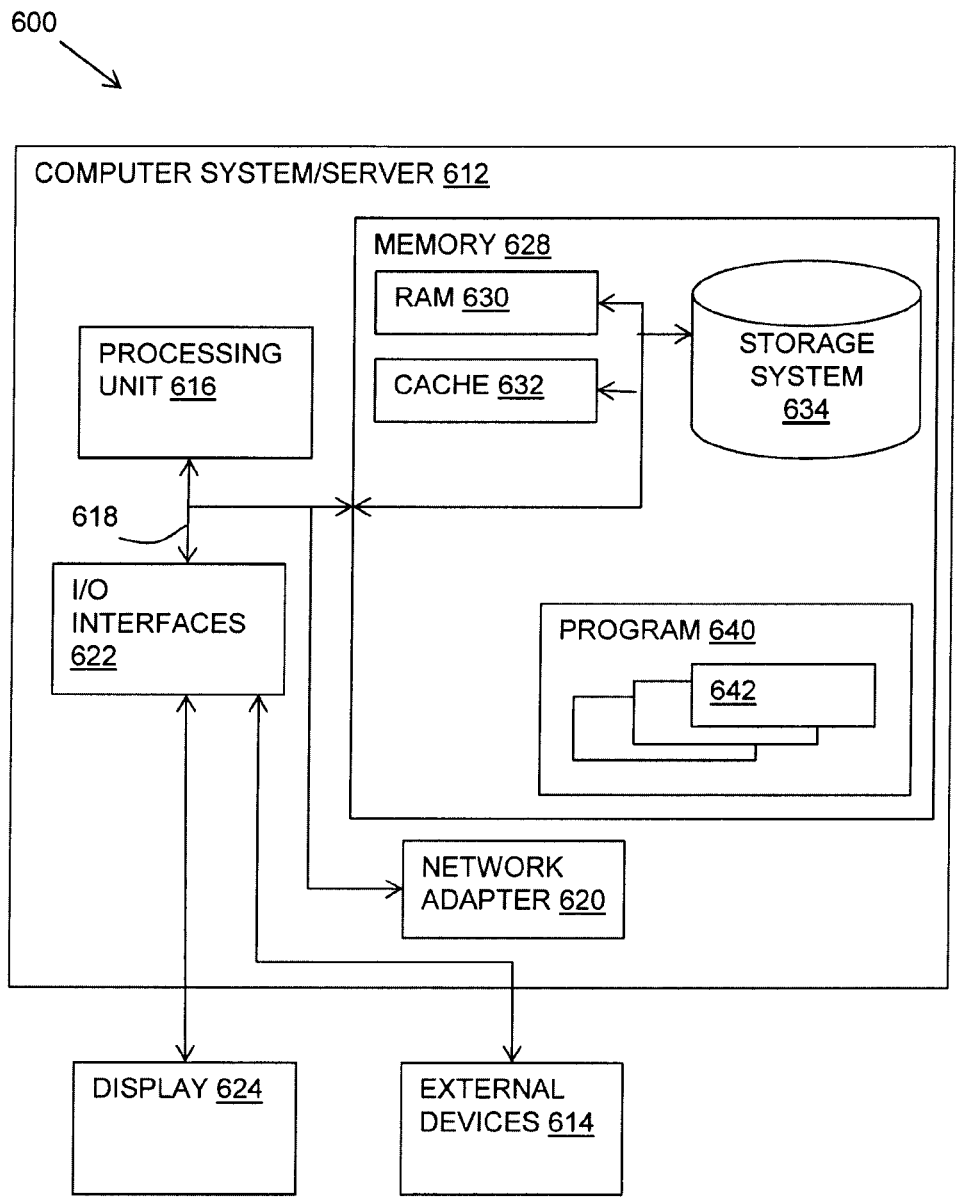
FIG. 6 is a block diagram of an embodiment of a computer system in which one or more aspects of the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are conFIG.d to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

As described herein, according to an embodiment of the present invention, there is provided a computer-implemented method for providing user interface options carried out by a user interface (UI) adapter, comprising: identifying a request event relating to a visible text string for a UI element of an application; inspecting a user value area of a control of the UI element to obtain a resource bundle name and key for one or more language equivalents of the text string of the UI element; and adding a menu option to the request event by retrieving the language equivalent of the text string in one or more languages from a resource bundle of the application using the resource bundle name and key.

The resource bundle name and key may be stored at the user value area of the control of the UI element as a result of the resource bundle name and key having been transmitted by code inserted into the object code of an application by a pre-compiler component.

The method may include: determining the one or more language equivalents that are available in the resource bundle by referencing the resource bundle name and key; and wherein adding a menu option adds a menu option for each language equivalent.

The method may include: determining if a primary language equivalent is available in the resource bundle by referencing the resource bundle name and key; and wherein adding a menu option adds a menu option for the primary language equivalent.

Inspecting a user value area of a control of the UI element may determine if the bundle name and key are available.

The method may include: intercepting a selection of the menu option of the request event; locating the bundle name and key for a language equivalent; retrieving a language equivalent value by looking up the named resource bundle and identifying a properties file for the language and retrieving the value for the specified key; and carrying out the request event with the language equivalent value.

In one embodiment, the request event is a copy request for a text string of a UI element. In another embodiment, the request event is to display a text string of a UI element.

According to another aspect of the present invention, there is provided a computer-implemented method for providing user interface options carried out by a pre-compiler component, comprising: recognizing a code statement in an object code of an application that retrieves language bundle values for use in a UI element; and injecting code into the object code of the application to transmit a bundle name and key to the user interface elements for storage at the user value area of the control of the UI element.

The method may inject runtime byte codes into the object code while keeping the source code original. Recognizing a code statement may recognize syntax of the statements of a string externalizer.

According to a further aspect of the present invention, there is provided a system for providing user interface options, including a user interface (UI) adapter comprising: a processor and a memory configured to provide computer program instructions to the processor to execute the function of the components; an identifying component for identifying a request event of a visible text string relating to a UI element of an application; an inspecting component for inspecting a user value area of a control of the UI element to obtain a resource bundle name and key for one or more language equivalents of the text string of the UI element; and a menu adding component for adding a menu option to the request event for one or more language equivalents by retrieving the language equivalent of the text string in one or more languages from a resource bundle of the application using the resource bundle name and key.

The resource bundle name and key may be stored at the user value area of the control of the UI element as a result of the resource bundle name and key having been transmitted by code inserted into the object code of an application by a pre-compiler component.

The system may include: a language determining component for determining the one or more language equivalents that are available in the resource bundle by referencing the resource bundle name and key; and wherein the menu adding component adds a menu option for each language equivalent.

The system may include: a primary language component for determining if a primary language equivalent is available in the resource bundle by referencing the resource bundle name and key; and wherein the menu adding component adds a menu option for the primary language equivalent.

The inspecting component for inspecting a user value area of a control of the UI element may determine if the bundle name and key are available.

The system may include: an intercepting component for intercepting a selection of the menu option of the request event; a locating component for locating the bundle name and key for a language equivalent; and a language retrieving component for retrieving a language equivalent value by looking up the named resource bundle and identifying a properties file for the language and retrieving the value for the specified key.

According to a further aspect of the present invention, there is provided a system for providing user interface options, including a pre-compiler component, comprising: a statement recognizing component for recognizing a code statement in an object code of an application that retrieves language bundle values for use in a UI element; and an injection component for injecting code into the object code of the application to transmit a bundle name and key to the user interface elements for storage at the user value area of the control of the UI element.

According to a further aspect of the present invention, there is provided a computer program product for providing user interface options, the computer program product comprising a computer readable storage medium having program instructions embodied therewith, the program instructions executable by a processor to cause the processor to: identify a request event relating to a visible text string for a UI element of an application; inspect a user value area of a control of the UI element to obtain a resource bundle name and key for one or more language equivalents of the text string of the UI element; and add a menu option to the request event by retrieving the language equivalent of the text string in one or more languages from a resource bundle of the application using the resource bundle name and key.

According to a further aspect of the present invention, there is provided a computer program product for providing user interface options, the computer program product comprising a computer readable storage medium having program instructions embodied therewith, the program instructions executable by a processor to cause the processor to: recognize a code statement in an object code of an application that retrieves language bundle values for use in a UI element; and inject code into the object code of the application to transmit a bundle name and key to the user interface elements for storage at the user value area of the control of the UI element The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of aspects of the present invention.

What is claimed is:

1. A computer-implemented method of providing user interface (UI) options carried out by a user interface adapter, the computer-implemented method comprising:
    identifying a request event relating to a text string in a first human language for a UI element of user interaction of an application;
    inspecting a user value area of a control of the UI element to obtain a resource bundle name and key for one or more second human language equivalents of the text string of the UI element, wherein the one or more second human language equivalents is a different human language from the first human language and is provided in context as part of the application; and
    adding a menu option to the request event by retrieving at least one of the one or more second human language equivalents from a resource bundle of the application using the resource bundle name and key.

2. The computer-implemented method as claimed in claim 1, wherein the resource bundle name and key are stored at the user value area of the control of the UI element as a result of the resource bundle name and key having been transmitted by code inserted into object code by a pre-compiler component.

3. The computer-implemented method as claimed in claim 1, further comprising determining the at least one of the one or more second human language equivalents that are available in the resource bundle by referencing the resource bundle name and key, wherein the adding the menu option adds a menu option for each second human language equivalent.

4. The computer-implemented method as claimed in claim 1, further comprising determining whether a primary human language equivalent is available in the resource bundle by referencing the resource bundle name and key, wherein the adding the menu option adds a menu option for the primary human language equivalent.

5. The computer-implemented method as claimed in claim 1, wherein the inspecting the user value area of the control of the UI element determines whether the bundle name and key are available.

6. The computer-implemented method as claimed in claim 1, further comprising:
intercepting a selection of the menu option of the request event;
locating the bundle name and key for the at least one of the one or more second human language equivalents;
retrieving a human language equivalent value by looking up a named resource bundle and identifying a properties file for the language equivalent and retrieving a value for the specified key; and
carrying out the request event with the human language equivalent value.

7. The computer-implemented method as claimed in claim 6, wherein the request event is a copy request for the text string of the UI element.

8. The computer-implemented method as claimed in claim 6, wherein the request event is to display the text string of the UI element.

9. The computer-implemented method as claimed in claim 1, further comprising:
recognizing, by a pre-compiler component, a code statement in object code that retrieves language bundle values for use in UI elements; and
injecting lines into the object code to transmit the bundle name and key to user interface elements during compiling of the application.

* * * * *